United States Patent
Efrati et al.

(10) Patent No.: US 6,453,845 B1
(45) Date of Patent: Sep. 24, 2002

(54) DISPOSABLE PET LITTER BAG

(76) Inventors: Elie Efrati, 3/2 Bartenura St., Tel Aviv (IL); Avi Naim, 542 Hazayit St., Schunat Habrecha, Bet Aryeh (IL)

(*) Notice: Subject to any disclaimer, the term of this patent is extended or adjusted under 35 U.S.C. 154(b) by 0 days.

(21) Appl. No.: 09/765,445

(22) Filed: Jan. 22, 2001

(51) Int. Cl.[7] .............................................. A01K 29/00
(52) U.S. Cl. ..................... 119/168; 119/165; 383/41; 383/66; 383/104
(58) Field of Search ...................... 119/165, 168, 119/170; 383/66, 104, 41

(56) References Cited

U.S. PATENT DOCUMENTS

| | | | |
|---|---|---|---|
| 819,056 A | * 5/1906 | Garber | 119/497 |
| 3,156,213 A | * 11/1964 | Patten | 119/497 |
| 4,236,615 A | * 12/1980 | Ginat | 190/103 |
| 4,394,955 A | * 7/1983 | Raines et al. | 383/104 |
| 4,760,816 A | 8/1988 | Rhodes | |
| 4,872,420 A | 10/1989 | Shepard | |
| 4,883,675 A | * 11/1989 | Wernz | 206/568 |
| 4,884,527 A | 12/1989 | Skirvin | |
| 4,930,906 A | * 6/1990 | Hemphill | 229/117.57 |
| 4,981,104 A | 1/1991 | Goodwin | |
| 5,027,748 A | 7/1991 | Wolak | |
| 5,033,780 A | * 7/1991 | Wootten | 15/104.8 |
| 5,046,457 A | * 9/1991 | Ashcroft et al. | 119/168 |
| 5,065,702 A | 11/1991 | Hasiuk | |
| 5,117,781 A | 6/1992 | Roach | |
| 5,167,205 A | * 12/1992 | Bell et al. | 119/168 |
| 5,178,100 A | 1/1993 | Monk | |
| 5,244,136 A | * 9/1993 | Collaso | 224/235 |
| 5,396,864 A | 3/1995 | Mannschreck | |
| 5,682,838 A | * 11/1997 | Reich | 119/709 |
| 5,868,227 A | * 2/1999 | Garcia | 150/106 |
| 5,955,160 A | * 9/1999 | Tanaka et al. | 206/810 |
| 6,164,821 A | * 12/2000 | Randall | 150/120 |

FOREIGN PATENT DOCUMENTS

CH 612141 A * 7/1979

* cited by examiner

Primary Examiner—Charles T. Jordan
Assistant Examiner—John W. Zerr
(74) Attorney, Agent, or Firm—Mark M. Friedman

(57) ABSTRACT

A disposable pet litter bag, and a method of using thereof, the method including the steps of: (a) providing the pet litter bag in a folded position, the pet litter bag including: (i) a bottom wall; (ii) a first side wall connected to the bottom wall; (iii) a second side wall connected to the bottom wall; (iv) a rear wall connected to the bottom wall, to the first side wall and to the second side wall; and (v) a front wall connected to the bottom wall, to the first side wall and to the second side wall; (b) separating the front wall and the rear wall to form a top opening in the pet litter bag; (c) applying an internal pressure against the first side wall and against the second side wall, via the top opening, to establish the pet litter bag in a fully open position, and (d) opening an opening in a wall of the walls of the pet litter bag for ingress and egress of a pet.

21 Claims, 2 Drawing Sheets

DISPOSABLE PET LITTER BAG

FIELD AND BACKGROUND OF THE INVENTION

This invention relates to a pet litter bag, and more particularly, to a disposable cat litter bag that is hygienic, simple to manufacture and use, and easy to erect and to dispose of.

Since ancient times domestic cats and humans have enjoyed a mutually beneficial relationship. In exchange for food and shelter, the cat provides its owner with companionship and controls the population of mice, rats and vermin. For many generations, cats resided primarily in barns, granaries, warehouses and other outbuildings on the property of the owner. However, with the ever-increasing urbanization of society, cats have overtaken dogs as the most common pet, because they are more adapted to the indoor living conditions imposed by apartment houses and other small residences, which lack the open spaces that dogs require for roaming. Furthermore, cats can be trained to drop their waste indoors and do not require outdoor walking. In the urban society of today, domestic cats spend most of their time in houses and apartments, and it is not unusual for cats to live their entire life within such domestic confines.

Various problems are associated with the co-existence of humans and cats in such an indoor environment, including the acute and unpleasant problem of cat waste disposal. While the use of absorbent granular pet litter in open flat containers has achieved nearly universal acceptance, the replacement of the litter and the disposal of spent litter is messy and non-hygienic.

In addition, not all the waste is absorbed. Waste often adheres to the sides and bottom of the litter container, resulting in repelling odors, and necessitating periodic cleaning and disinfecting of the container itself. Furthermore, the cat's natural inclination to bury its wastes often causes litter and waste to be thrown out of the container. Finally, cat waste and litter contain fleas and ticks that pose health problem to both the cat and cat owner. Most dangerous is a parasite found in cat waste, that causes toxoplasmosis, a harmful condition particularly for pregnant women.

Various disposable pet litter containers of different designs and configurations have been suggested by the prior art, some of which are complicated to erect and use, while others are more convenient to apply.

U.S. Pat. No. 4,872,420 to Shepard discloses an open container having an inner disposable liquid-proof bag attached to the container, making it possible to detach the bag after use and close the bag by means of a draw string prior to disposal. Containers of this kind are more hygienic, less messy, and less dangerous to the health of the owner of the cat and provide an easier method of disposal. However, repelling odor, as well as litter and waste thrown out of the container due to "burying", are still unsolved problems.

Other various disposable pet litter boxes of various designs have been suggested by the prior art, some of which are relatively complicated to erect and require various folding techniques. U.S. Pat. No. 5,117,781 to Roach and U.S. Pat. No. 5,027,748 to Wolak are examples of such litter boxes. Some of the above-mentioned litter boxes already contain the pet litter, while others require the addition of the pet litter after erection and prior to use. Although these sort of boxes solve most of the problems involved with open top flat litter containers, they are complicated to erect, relatively heavy and expensive.

Several disposable litter containers that are lighter and easier to erect have been disclosed. A typical example is U.S. Pat. No. 5,178,100 to Monk. However, these boxes are still relatively expensive to manufacture and purchase.

In a different approach, U.S. Pat. No. 4,884,527 to Skirvin discloses a paper construction that unfolds from a flat cardboard box. In U.S. Pat. No. 4,760,816 to Rhodes and U.S. Pat. No. 5,065,702 to Hasiuk, the container has an accordion-like pleated structure. Although these containers are light and easy to erect, they require large quantities of raw materials and are therefore expensive and wasteful.

An example of a more simple disposable pet litter container consisting of a paper tent-like closure unfolded from a cardboard flat box for holding the litter is disclosed in U.S. Pat. No. 4,981,104 to Godwin. In contrast to previously mentioned designs, the container taught by U.S. Pat. No. 4,981,104 is inexpensive to manufacture. A similar container that consists only of paper, tent-like walls and a thin cardboard bottom that form a closure for a cat is described in U.S. Pat. No. 5,396,864 to Mannschreck. The container is purchased and stored in packages similar to ordinary packaging paper bags. Although this container is inexpensive, very light, and simple to store, it is particularly awkward to open, because of the closed top. Consequently, the container must be opened by inserting two hands into the container via the side opening (i.e., the small opening through which the cat enters and exits the structure), and then applying pressure against the walls from within. Similarly, fresh litter must be inserted, inconveniently, through the side opening.

There is therefore a recognized need for, and it would be highly advantageous to have, a pet litter bag that is inexpensive, hygienic and simple to manufacture, and is particularly convenient to erect and use.

SUMMARY OF THE INVENTION

The present invention is a disposable cat litter bag, which is hygienic, and simple to manufacture and use.

It is an object of the present invention to provide a pet litter bag system that is convenient to erect and with which the handling of pet litter is less unpleasant.

It is also an object of the present invention to provide a pet litter system that is easily disposed of.

It is a further object of the present invention to provide a pet litter system that is lighter and more convenient for shipment and storage.

It is also a further object of the present invention to provide a pet litter system that is more comfortable and roomy for a pet, for a given floor area.

According to the teachings of the present invention there is provided a disposable pet litter bag for receiving the waste of a household pet, the bag being made of stiff paper, including: (a) a bottom wall; (b) a first side wall connected to the bottom wall; (c) a second side wall connected to the bottom wall; (d) a rear wall connected to the bottom wall and to the first and second side walls; (e) a front wall connected to the bottom wall and to the first and second side walls; and (f) a mechanism for providing a secure closure between the rear wall and the front wall, wherein the first side wall, the second side wall, the rear wall and the front wall have pre-creased folding lines for folding the bag.

According to another aspect of the present invention there is provided a method of using pet litter bag including the steps of: (a) providing the pet litter bag in a folded position, the bag consisting of: (i) a bottom wall; (ii) a first side wall connected to the bottom wall; (iii) a second side wall connected to the bottom wall; (iv) a rear wall connected to the bottom wall, the first side and second side walls; (v) a front wall connected to the bottom wall, the first and second side walls; and (vi) a mechanism for securely closing the rear and the front walls, the mechanism mounted on the upper end of the rear and the front walls; (b) separating the front and the rear walls to form a top opening in the pet litter bag.

According to one feature in the described preferred embodiments, the mechanism disposed on an upper end of the rear wall and the front wall.

According to a further feature in the described preferred embodiments, the pet litter bag further includes a side opening in a wall, the side opening being configured for ingress and egress of a pet.

According to another feature in the described preferred embodiments, the side opening is preformed by perforations.

According to yet another feature in the described preferred embodiments, the perforations have a substantially U-shape, such that upon tearing the perforations, a door is formed in the side opening.

According to still another feature in the described preferred embodiments, the door is designed and configured to close after ingress of the pet to the pet litter bag, and egress of the pet from the pet litter bag.

According to a further feature in the described preferred embodiments, the side opening is designed and configured to be closed and sealed.

According to yet a further features in the described preferred embodiments, the front and rear walls further include a pair of handles for carrying the pet litter bag.

According to still a further feature in the described preferred embodiments, the handles are designed and configured as the mechanism for providing the connection between the rear and the front walls. The mechanism is mounted on the upper end of the rear and the front walls.

According to a further feature of the described preferred embodiments, the secure closure includes a detachable connection.

According to yet a further feature of the described preferred embodiments, the secure closure includes flat flexible wire.

According to still a further feature of the described preferred embodiments the secure closure includes pressure adhesive disposed on the inner ends of the rear and front walls.

According to another feature of the described preferred embodiments, the detachable closure includes a first band having cylindrical protruding pins and a second band having complementary recesses for receiving the cylindrical protruding pins.

According to another feature of the described preferred embodiments, the detachable closure includes at least one loop and hook connection.

According to a further feature of the method, the top opening is formed by the step of: (c) applying an internal pressure against the first side wall and second side wall to establish the pet litter bag in a fully open position.

According to a preferred embodiment of the invention, the method includes a further step of: (d) opening a side opening in a wall of the pet litter bag, the side opening having a U-shape thereby forming a door in the side opening.

According to yet a preferred embodiment of the invention, the method includes a further step of: (e) automatically closing the door after ingress of said pet to, and egress of the pet from the pet litter bag.

According to still a preferred embodiment of the invention, the applying of an internal pressure against the side walls is achieved by inserting hands via the top opening.

According to yet a further embodiment, the method further includes the step of: (e) introducing pet litter via the top opening.

According to another preferred embodiment, the method further includes the step of: (f) attaching the rear and front walls to close the top opening.

According to still another preferred embodiment, the method further includes closing and sealing the side opening.

According to yet another preferred embodiment, the method includes the attaching of the rear and front walls by folding over the top ends of the rear and front walls of the pet litter bag.

According to still another preferred embodiment, the attaching of the rear and front walls further includes bending a first flat flexible wire and a second flat flexible wire around the pet litter bag, thereby crimping closed or fastening closed the pet litter bag.

According to still another preferred embodiment, the attaching of the rear and front walls further includes vertically bending a flat flexible wire around the pet litter bag, thereby crimping closed or fastening closed the pet litter bag.

According to still another preferred embodiment, the method includes the attaching of the rear and front walls by a pressure adhesive.

According to a further preferred embodiment, the method includes the attaching of the rear and front walls by pressing a first band having cylindrical protruding pins into complementary recesses in a second band.

According to yet a further preferred embodiment, the method includes the attaching of the rear and front walls by connecting a plurality of loop and a hook connections.

The present invention successfully addresses the shortcomings of the existing technologies by providing a system for and method of housing a cat or other pet in a disposable pet litter bag, that is hygienic, inexpensive, and particularly convenient to erect, use and dispose of.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
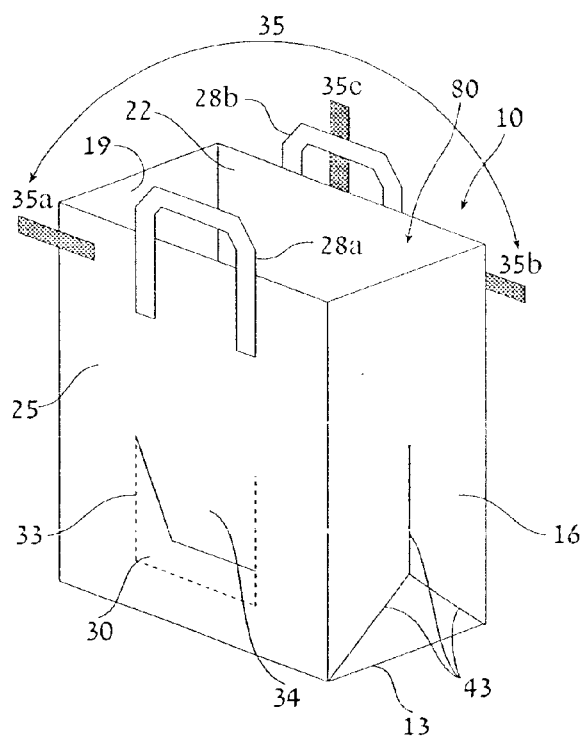
FIG. 1 is a perspective view of the pet litter bag of the present invention in an erected position, with the mechanism for connection in a detached position (closing the top opening), after opening the perforations of the side opening and with the door partially open.

The present invention is a system for, and a method of, housing a cat or other pet in a disposable pet litter bag, that is hygienic, inexpensive, and particularly convenient to erect and use.

The principles and operation of the system and method according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As used herein in the specification and in the claims section that follows, the term paper refers to paper of various types, preferably recycled paper, and paper-like materials, for example, thin plastic sheets or paper reinforced with synthetic fibers.

Referring now to the drawings, FIG. 1 is a perspective view of the disposable pet litter bag 10 in an erected position, with a mechanism for connection in a detached position. According to the present invention, the disposable pet litter bag 10 is made of stiff paper, for example #70 Kraft paper, and has, preferably, a thickness in the range from about 5 to about 40 mils. The inner surface of the paper is treated to render the paper substantially waterproof, for example by applying a layer of wax. Alternatively, the inner surface is lined with a thin polyethylene layer (not shown in the drawings), preferably having a thickness of about 0.5 to about 1.0 mm.

The disposable pet litter bag 10 includes a bottom 13, a first side wall 16, a second side wall 19, a rear wall 22 and a front wall 25. Each one of these walls is connected to the bottom 13. Rear wall 22 and the front wall 25 are also connected to the first side wall 16 and the second side wall 19 to form an open top pet litter bag 10.

The opening of pet litter bag 10 is preferably performed by separating rear wall 22 from front wall 25, inserting hands, and applying pressure on the walls from the inside of pet litter bag 10 until bag 10 is erected in an open top position. This opening is particularly convenient in comparison to the prior art of a tent-like container having a permanently closed top, in which opening of the container is achieved by inserting two hands into the container via the constricting and inconvenient side opening (i.e., the opening through which the pet enters and exits) and applying inner pressure against the walls.

According to a preferred embodiment, the separation is effected using handles 28a, 28b, which are also used for easy carrying of pet litter bag 10. A first handle 28a is affixed to the top of rear wall 22 and a second handle 28b to the top of front wall 25.

A side opening 30, which can be in a variety of shapes, for example, rectangular or round, is cut in one of the walls to allow the ingress to, and egress of a pet from, pet litter bag 10. In a preferred embodiment, a series of U-shaped perforations 33 is opened to form side opening 30 and door 34 that is connected at the upper end to front wall 25. The side opening 30 is sized and adapted so that the pet can easily enter into, and exit from, pet litter bag 10. In contrast to the prior art, pet litter bag 10, according to the present invention, is closed and secured by a mechanism 35 for connecting rear wall 22 and front wall 25.

Mechanism 35 can be of various designs, including detachable connections. One such design, shown in FIGS. 1 to 5, consists of flat flexible wires (or bands) 35a and 35b, each wire preferably lined with a plastic material and having a thickness of about 0.5 to 1.0 mm. One wire 35b is affixed to the side of rear wall 22 and the other wire 35a to front wall 25. Flexible wires 35a and 35b are designed and configured to bend around pet litter bag 10 and crimp or fasten to the opposing wall, such that the top of pet litter bag 10 is securely closed.

In another preferred embodiment, a single flexible wire 35c, affixed to the top of rear wall 22 or front wall 25, is designed and configured to bend vertically around pet litter bag 10 and crimp or fasten to the opposing wall, such that the top of pet litter bag 10 is securely closed.

Figure 5:
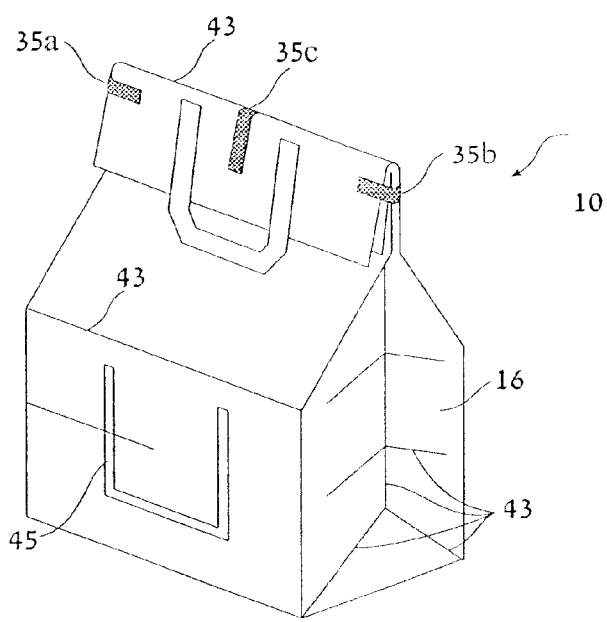
FIG. 5 is a perspective view of the pet litter bag after erection and prior to disposal, with the front and rear walls in a connected position, and after resealing the side opening.

Although in FIG. 5, the above-described flexible wires (35a–35b, 35c) are fastened after folding over the top of pet litter bag 10, it must be emphasized that the above-described flexible wires can be positioned so as to fasten or crimp closed the pet litter bag without first folding over the top of the bag.

An alternative design of mechanism 35 consists of a pressure adhesive protected by a strip of paper, similar to the system used for closing envelopes, disposed on the inner upper end of at least one of walls 22 and 25. In order to attach these two walls, the protective strips are peeled off, and subsequently, rear wall 22 and front wall 28 are pressed together.

In another preferred embodiment of mechanism 35, pet litter bag 10 is manufactured such that one of walls 22, 25 is longer than the other, preferably by about 7 to about 10 cm. The longer wall is folded over the shorter wall; the protective strip is peeled off the longer wall and walls 22, 25 are pressed together to form the connection.

Figure 6:
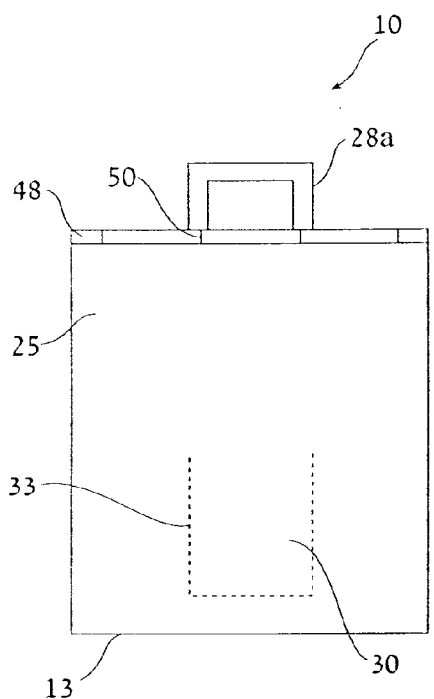
FIG. 6 is a front elevation view of the pet litter bag in an unfolded position, prior to opening the perforations of the side opening.
Figure 7:
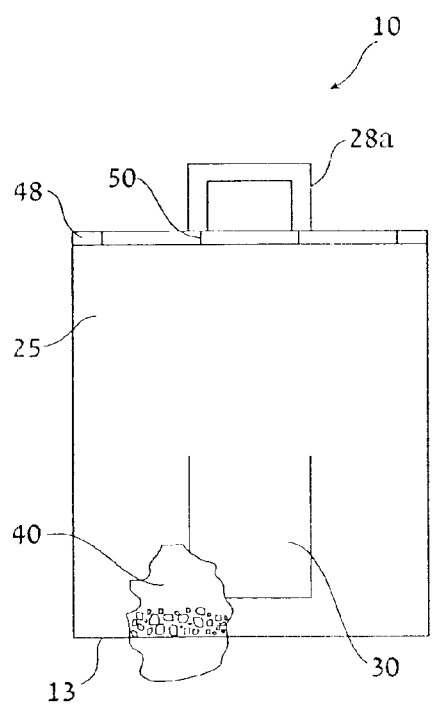
FIG. 7 is a front elevation view of the pet litter bag in an unfolded position, with an open side opening.

According to a further preferred embodiment, illustrated in FIGS. 6 and 7, the mechanism for connection 35 consists of strips 48a, 48b connected to the upper end of rear wall 22 and front wall 28. One of the strips has 2 to 4 cylindrical protruding pins 50, each having a diameter of about 3 to about 7 mm, which are pressed into complementary recesses in the second strip.

According to yet another preferred embodiment, mechanism 35 contains handles 28a and 28b. Handles 28a and 28b, by way of example, can be equipped with the above-mentioned protruding pins 50 and complementary recesses.

Before connecting the rear wall 22 with the front wall 25, fresh litter (usually, an absorbing aggregate) is preferably inserted into the pet litter bag 10 via the top opening.

The pet litter bag 10 of the present invention may, of course, be fabricated in various sizes to accommodate pets of various sizes.

Figure 2:
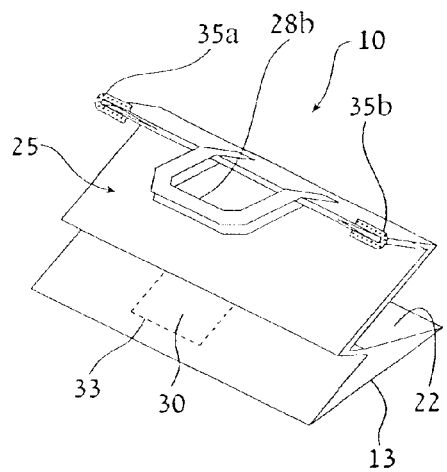
FIG. 2 is a perspective view of the pet litter bag in a folded position prior to use.
Figure 3:
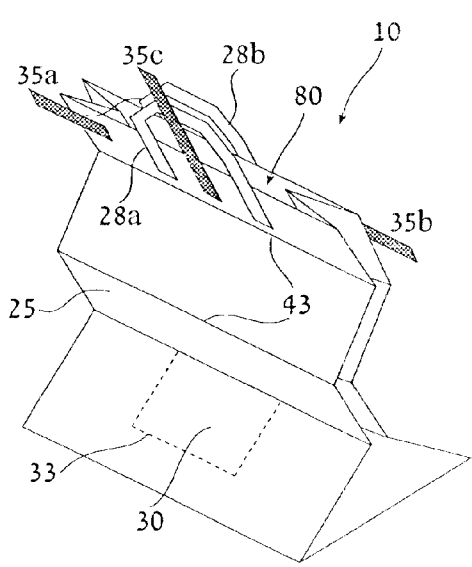
FIG. 3 is a perspective view showing an intermediate position in the unfolding of the pet litter bag.
Figure 4:
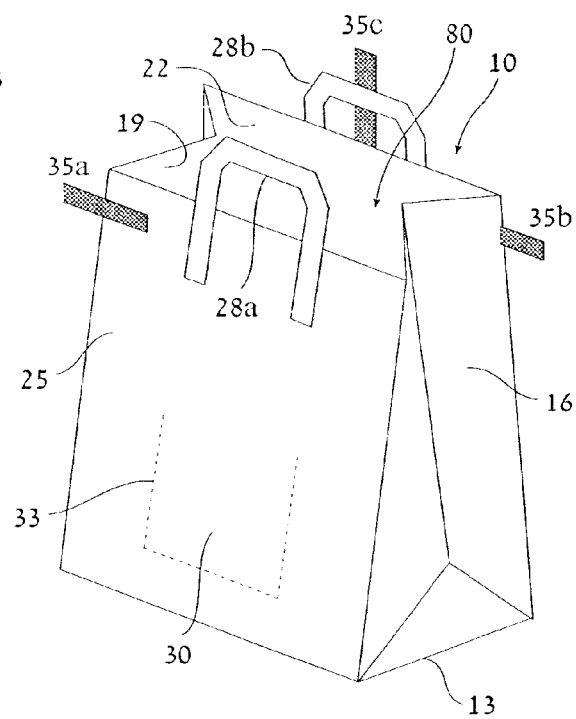
FIG. 4 is a perspective view of the pet litter bag in a nearly erected position.

FIGS. 2 to 4 are perspective views that demonstrate unfolding of the disposable pet litter bag 10 from a folded position (FIG. 2) to an almost unfolded position (FIG. 4). With the top opening of pet litter bag 10 situated in a slightly open position, as shown in FIG. 3, it is particularly effective and convenient to open pet litter bag 10 by inserting two hands through top opening 80 and exerting pressure on the internal walls of pet litter bag 10, until bag 10 achieves a fully open position (as in FIG. 1).

Pet litter bag 10 has pre-creased folding lines 43 on the rear wall 22, the front wall 25, the first side wall 16, and the second side wall 19, thereof, enabling pet litter bag 10 to fold into a flat and folded position that is particularly compact and suitable for shipment and storage.

FIG. 7 is a front elevation view of the pet litter bag 10 in an unfolded position, an open side opening 30 for the ingress and egress of the pet and with pet litter 40 in bag 10.

According to a preferred embodiment, before the disposal of pet litter bag 10, opening 30 is sealed and secured by adhesive strips 45. FIG. 5 illustrates the pet litter bag 10 in a sealed position, and with rear wall 22 and front wall 25 attached by mechanism 35. The pet litter bag 10, in this position, can be carried by handles 28a, 28b and disposed of.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of using a pet litter bag, the method comprising the steps of:
    (a) providing the pet litter bag in a folded position, the pet litter bag including:
        (i) a bottom wall;
        (ii) a first side wall connected to said bottom wall;
        (iii) a second side wall connected to said bottom wall;
        (iv) a rear wall connected to said bottom wall, to said first side wall and to said second side wall; and
        (v) a front wall connected to said bottom wall, to said first side wall and to said second side wall;
    (b) separating said front wall and said rear wall to form a top opening in the pet litter bag;
    (c) applying an internal pressure against said first side wall and against said second side wall, via said top opening, to establish the pet litter bag in a fully open position, and
    (d) opening a side opening in a wall of said walls adjacent to said bottom wall of the pet litter bag for ingress and egress of a pet;
    (e) wherein said pet litter bag defines a single interval volume that fills an interior of said pet litter bag in said fully open position.

2. The method of claim 1, wherein said opening in said wall has a substantially U-shape, thereby forming a door in said side opening.

3. The method of claim 2, further comprising the step of:
    (e) automatically closing said door after said pet passes through said door.

4. The method of claim 1, wherein said internal pressure is applied by inserting hands via said top opening.

5. The method of claim 1, further comprising the step of:
    (e) introducing pet litter via said top opening.

6. The method of claim 1, further comprising the step of:
    (e) attaching said rear wall and said front wall to close said top opening.

7. The method of claim 1, further comprising the step of:
    (e) closing and sealing said opening in said wall.

8. The method of claim 6, wherein said attaching is effected by folding over a top end of said front wall and said rear wall.

9. The method of claim 6, wherein said attaching is effected by bending a first flat flexible wire and a second flat flexible wire around the pet litter bag, thereby crimping closed the pet litter bag.

10. The method of claim 6, wherein said attaching is effected by vertically bending a flat flexible wire around the pet litter bag, thereby crimping closed the pet litter bag.

11. The method of claim 6, wherein said attaching is effected by pressing a first band having cylindrical protruding pins into complementary recesses in a second band.

12. A disposable pet litter bag for receiving the waste of a household pet, the bag being made of stiff paper, comprising:
    (a) a bottom wall;
    (b) a first side wall connected to said bottom wall;
    (c) a second side wall connected to said bottom wall;
    (d) a rear wall connected to said bottom wall and to said first and second side walls;
    (e) a front wall connected to said bottom wall and to said first and second side walls; and
    (f) a side opening in a wall of the pet litter bag, said side opening configured for ingress and egress of the pet, said side opening placed adjacent to said bottom wall, said first side wall, said second side wall, said rear wall and said front wall forming a top opening for establishing the pet litter bag in an open position, at least some of said first side wall, said second side wall, said rear wall and said front wall having pre-creased folding lines for folding the pet litter bag, said pet litter bag defining a single interval volume that fills an interior of said pet litter bag in said open position.

13. The disposable pet litter bag of claim 1, further comprising:
    (g) a mechanism for providing a secure closure between said rear wall and said front wall.

14. The disposable pet litter bag of claim 13, wherein said mechanism is disposed on an upper end of said rear wall and said front wall.

15. The disposable pet litter bag of claim 12, wherein said side opening is preformed by a plurality of perforations.

16. The disposable pet litter bag of claim 15, wherein said plurality of perforations has a substantially U-shape, such that upon tearing of said perforations, a door is formed in said side opening.

17. The disposable pet litter bag of claim 16, wherein said door is designed and configured to close after ingress of said pet to the pet litter bag, and egress of said pet from the pet litter bag.

18. The disposable pet litter bag of claim 12, wherein said side opening is further designed and configured to be closed and sealed.

19. The disposable pet litter bag of claim 12, wherein said front and rear walls further include a pair of handles for carrying the pet litter bag.

20. The disposable pet litter bag of claim 13, wherein said secure closure is a detachable closure.

21. The disposable pet litter bag of claim 20, wherein said detachable closure is a first band having cylindrical protruding pins and a second band having complementary recesses for receiving said cylindrical protruding pins.

* * * * *